Patented June 26, 1928.

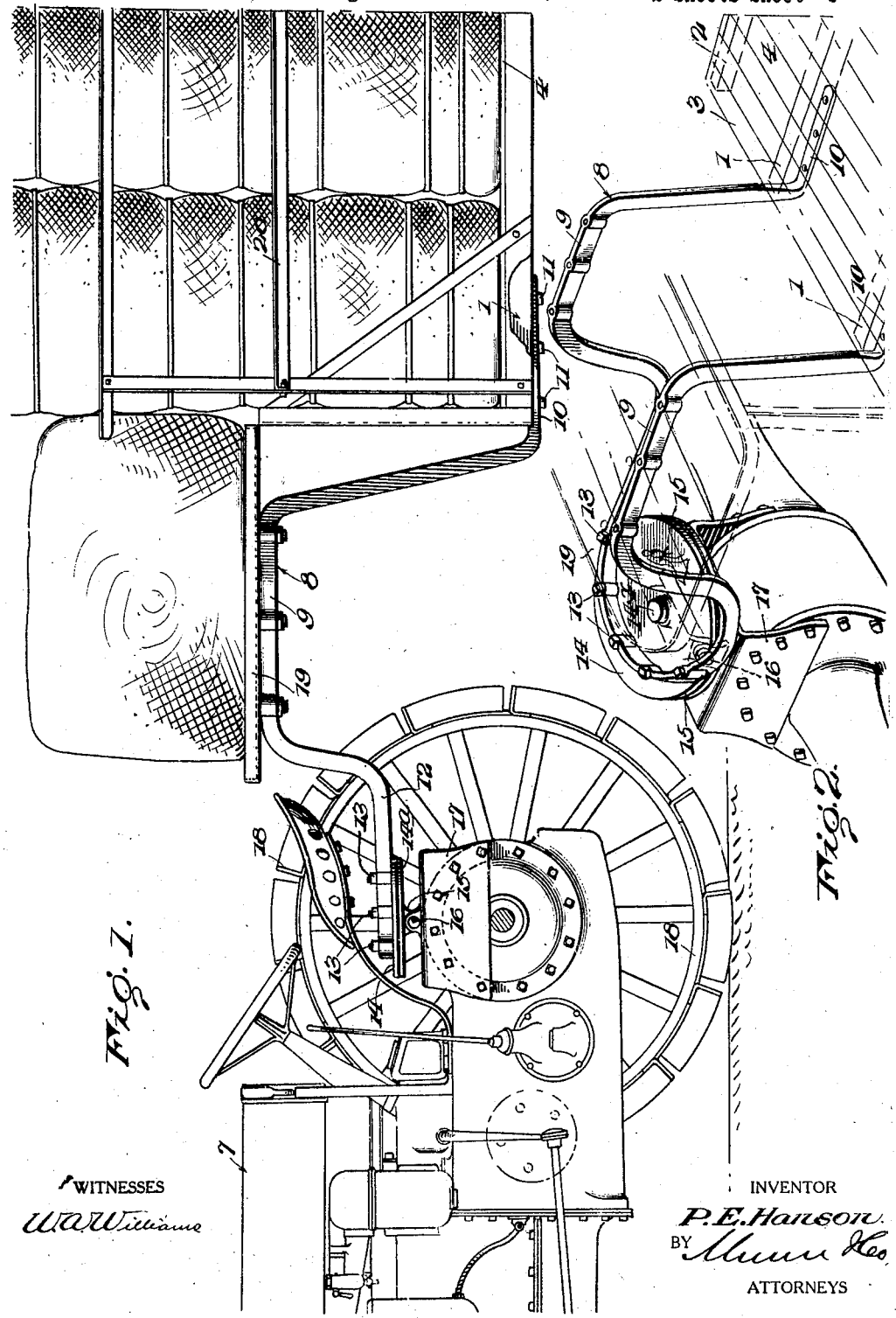

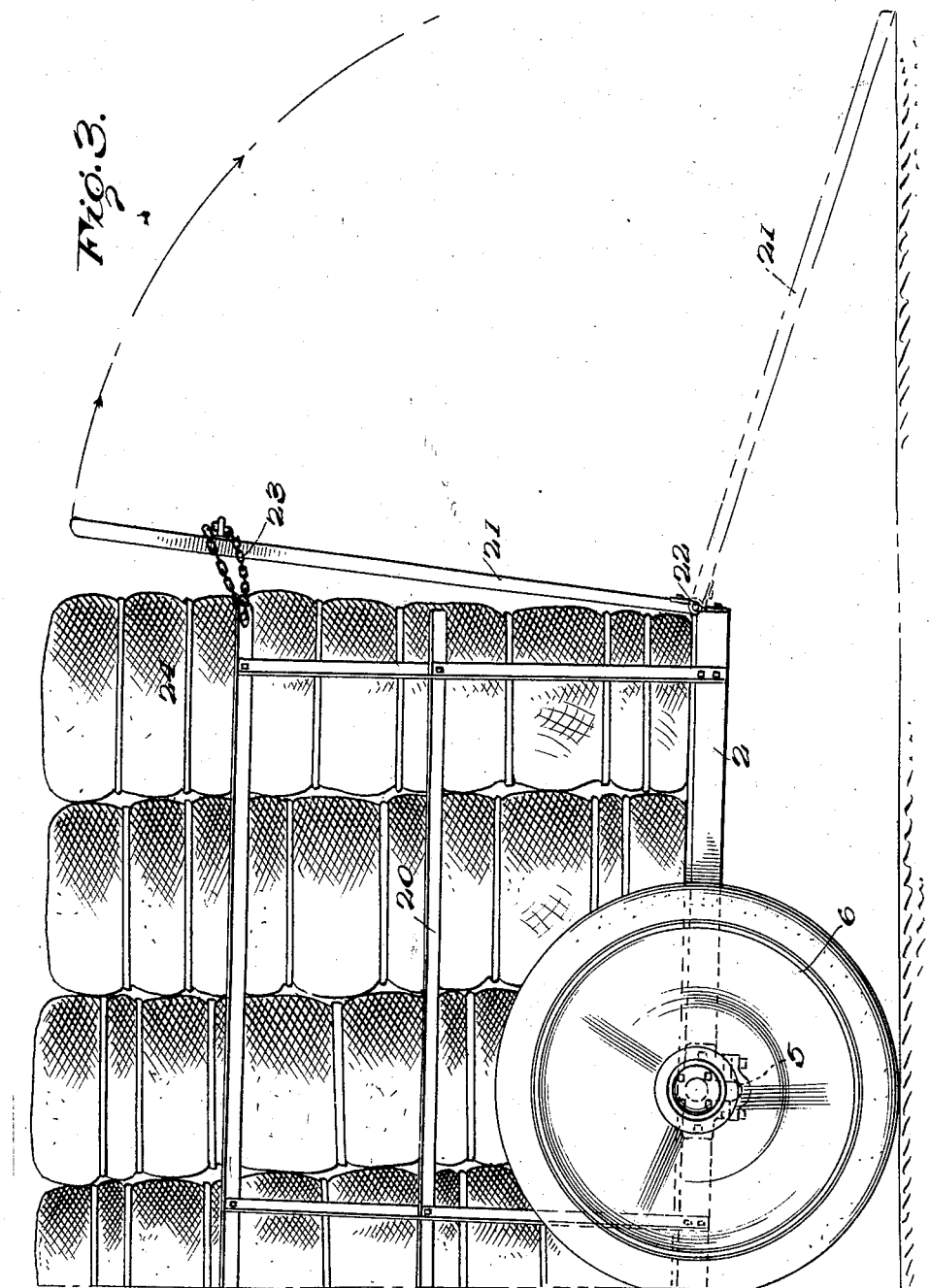

1,675,267

UNITED STATES PATENT OFFICE.

PETER EDWIN HANSON, OF GALVESTON, TEXAS.

TRACTOR TRAILER.

Application filed February 16, 1926, Serial No. 88,608. Renewed December 21, 1927.

My invention relates generally to trailers for automotive vehicles, more particularly to a trailer for a tractor and it consists in the combinations, constructions and arrangements herein described and claimed.

An object of the invention is the provision in a tractor trailer of coupling means for connecting the body of the trailer with the draft tractor so that the greater part of the load of the trailer will be supported by the tractor and the tractor can turn at a relatively sharp angle to the longitudinal axis of the trailer, as in turning a corner, without the wheels of the tractor coming in contact with the coupling means which connects the trailer with the tractor.

A further object of the invention is the provision in a trailer of a rear end gate which is hinged to the floor of the trailer substantially at the level of the trailer floor and is adapted to be lowered from position for closing the rear end of the body of the trailer to position to rest at its free edge on the ground and then to serve as a runway on which heavy articles, such as bales of cotton, can be transported in wheelbarrows, small hand truck, or the like onto the floor of the trailer.

Other objects and advantages of the invention will be apparent from the following description, considered in conjunction with the accompanying drawings, in which Figure 1 is a side elevation of the rear end portion of a tractor of a well known type of construction and the forward end portion of its trailer embodying the invention and connected with the tractor.

Figure 2 is a fragmentary perspective view of the coupling means for connecting the trailer with the tractor, and Figure 3 is a side elevation of the rear end portion of a trailer, showing in full lines the rear end gate in raised position for preventing falling of articles from the rear end portion of the body of the trailer and showing in dotted lines the rear end gate in lowered position and adapted to serve as a runway.

A trailer embodying the invention is intended primarily for use in transporting heavy loads of rather bulky objects such as bales of cotton. To this end, the body of the trailer may include relatively heavy frame members, such as the longitudinal spaced middle beams indicated at 1 in Fig. 3 and the longitudinal side beams, such as indicated at 2 in Figure 3, these longitudinal side beams being suitably braced and connected by cross beams, such as the front cross beam indicated at 3 in Figure 2. The floor 4 of the trailer body is supported on the frame and may be secured to the latter in any suitable known manner, not shown.

The frame of the body of the trailer carries a rear axle 5 which is located at a desirable distance from the rear end of the body of the trailer and which has the wheels 6 mounted thereon.

The coupling for connecting the body of the trailer with a tractor 7 and for cooperating with the wheels 6 and the axle 5 to support the body of the trailer substantially in horizontal position is indicated generally at 8 in Fig. 1. This coupling is of the goose-neck type and comprises a pair of spaced substantially inverted U-shaped members 9 having the rearward arms thereof turned in a rearward direction and substantially horizontal as indicated at 10, thus producing attaching members which are rigidly secured by suitable fastening devices 11 to the middle longitudinal beams 1 of the frame of the trailer body. The front arms of the inverted U-shaped members 9 have forwardly turned attaching end portions 12 which are rigidly secured by fastening devices 13 to a flat plate 14. The latter is swivelly attached to a flat plate portion 14ª of a bracket having a depending arm 15 which is connected by a horizontal pivot element 16 with an upstanding arm on a block 17. The block 17 is secured on the tractor, as for example on the rear axle housing of the latter. The inverted U-shaped members 9 are arched sufficiently to provide clearance for the rear wheels 18 of the tractor when the tractor is turned at a sharp angle to the longitudinal axis of the trailer. The tractor therefore can be operated to turn the trailer in a space of relatively slight area.

The web portions of the inverted U-shaped members 9 may have a platform 19 secured thereon which may be used for any desirable purpose, as for example, to accommodate workmen whose services are utilized in loading and unloading the trailer and also to support any suitable object which may be disposed thereon.

The body of the trailer carries suitable sideguard structures, such as indicated at 20. A rear end gate 21 is hinged at its lower edge at 22 to the body of the trailer and can be swung to raised position as shown by the full lines in Figure 3 or swung downwardly from the position shown by the full lines in Figure 3 to the position shown by the dotted lines in Figure 3. When the rear end gate is in raised position, it may be secured to the side guard structures of the trailer in any suitable known manner, as by means of the chain 23 and then will be adapted to prevent objects, such as the bales 24, from falling out of the space between the side guard structures of the trailer at the rear end of the latter. When the rear end gate is in its downwardly swung position as indicated by the dotted lines in Figure 3, it is adapted to serve as a run-way on which wheelbarrows, hand trucks, or like devices can be moved to transfer heavy objects, such as the bales 24 from the ground to the floor of the trailer, or vice versa.

The tractor is of a well known type of construction and the trailer can be connected with the tractor without any change in the ordinary construction of the tractor beyond the addition of the means for connecting the members 12 with the rear axle housing of the tractor.

It will be manifest from the foregoing remarks and description, that a trailer embodying the invention is simple in construction and affords facilities for the transporting of heavy loads and also permits the loading and unloading of the trailer to be accomplished in a minimum time with but relatively little labor.

Obviously, my invention is susceptible of embodiment in forms other than that illustrated in the accompanying drawings and I therefore consider as my own all such modifications and adaptations of the form of the device herein described as fairly fall within the scope of the appended claims.

I claim:—

1. In a trailer construction, a trailer body, and a coupling connecting the forward end portion of the trailer body with a draft vehicle, said coupling being transversely arched to afford clearance for the adjacent wheels of the draft vehicle when said draft vehicle is turned at an angle to the direction of length of the trailer body and the crown portions of the arched coupling also constituting a support upon which a platform may be supported.

2. A draft device including a channel shaped plate arranged to overlie the enlarged central part of a tractor axle housing with its parallel side flanges attached to the opposite ends of said axle part, a fifth wheel carried by the channel shaped plate, and a draw bar attached to the fifth wheel.

3. In a draft device a channel shaped plate for attachment to the axle housing of a motor vehicle, a disc above the channel shaped plate and pivotally connected to the latter to swing about a horizontal axis, a revolvable disc superimposed on the first mentioned disc, a pair of parallel inverted U-shaped members arranged rearwardly of the plate and having their rear ends attachable to a vehicle, horizontal forwardly extending contacting extensions formed with the forward legs of the inverted U-shaped members having curved terminals attached to the revolvable disc.

4. In a trailer construction, a coupling comprising a pair of substantially inverted U-shaped members having the rear arms thereof formed with rearwardly extending substantially horizontal portions adapted for connection with the body of the trailer, said coupling members having forwardly turned attaching end portions for pivotally connecting the coupling with a draft vehicle, the crown portions of said substantially inverted U-shaped members being adapted for connection with a platform which is to be supported thereon.

5. In a trailer construction, a coupling comprising a pair of substantially inverted U-shaped members having rearwardly extending attaching portions on the rearward arms thereof and having forwardly turned attaching end portions on the forward arms thereof, a bracket supported on the rear axle housing of a tractor for turning movement about a horizontal axis and having a flat plate portion, a plate supported on said bracket plate for turning movement about a vertical axis, and means connecting the attaching end portions of the front arms of said coupling members to said second named plate.

6. In a trailer construction, a body, having a pair of spaced longitudinally extending beams, a coupling comprising a pair of spaced inverted U-shaped members having rearwardly extending attaching arms secured to said beams, the front arms of said inverted U-shaped members having forwardly turned attaching end portions, a plate supported on the axle housing of a draft vehicle for turning movement about both vertical and horizontal axes, and means securing said forwardly turned attaching end portions of the coupling members to said plate.

7. In a draft device, an attaching element for connection with part of a motor vehicle, a fifth wheel carried thereby, a pair of substantially vertical parallel arms arranged rearwardly of the attaching element and arranged to be secured to a vehicle, forwardly extending horizontally arranged contacting extensions carried by the arms each of which having a curved terminal supported on and attached to one of the elements of the fifth wheel.

PETER EDWIN HANSON.